United States Patent [19]

Lindsay

[11] Patent Number: 4,592,680
[45] Date of Patent: Jun. 3, 1986

[54] RETENTION SYSTEM FOR ROTARY CUTTER HAVING REPLACEABLE CUTTING INSERTS

[76] Inventor: Harold W. Lindsay, 2451 NW. 30th, Portland, Oreg. 97210

[21] Appl. No.: 694,443

[22] Filed: Jan. 24, 1985

[51] Int. Cl.$^4$ .............................................. B23C 5/24
[52] U.S. Cl. ...................... 407/36; 407/41; 407/48; 407/49
[58] Field of Search ............... 407/41, 48–50, 407/40, 91, 94, 108, 109, 103, 104, 36–39

[56] References Cited

U.S. PATENT DOCUMENTS

| | | | |
|---|---|---|---|
| 3,662,444 | 5/1972 | Erkfritz. | |
| 3,708,843 | 1/1973 | Erkfritz. | |
| 3,788,625 | 1/1974 | Lindsay | 407/40 |
| 3,795,454 | 3/1974 | Elchyshyn | 407/104 |
| 3,946,475 | 3/1976 | Hopkins | 407/41 |
| 4,009,742 | 3/1977 | Ziegelmeyer | 407/49 |
| 4,164,380 | 8/1979 | Peters | 407/49 |
| 4,165,947 | 8/1979 | Smids. | |
| 4,195,955 | 4/1980 | Lindsay | 407/40 |

Primary Examiner—Francis S. Husar
Assistant Examiner—Jerry Kearns
Attorney, Agent, or Firm—Klarquist, Sparkman, Campbell, Leigh & Whinston

[57] ABSTRACT

A rotary cutter for holding replaceable cutting inserts includes a cylindrical bore having a generally radially-disposed axis which makes an acute angle with the insert cutting face, thus forming a wedge-shaped portion in the holder between the insert-supporting face and the axis of the bore. A cylindrical locking member is received in the bore. An insert-retaining locking screw threadedly engages the locking member. The wedge-shaped portion of the holder causes increased tension in the locking screw during rotation of the cutter, which insures insert retention at high rotational speeds.

2 Claims, 3 Drawing Figures

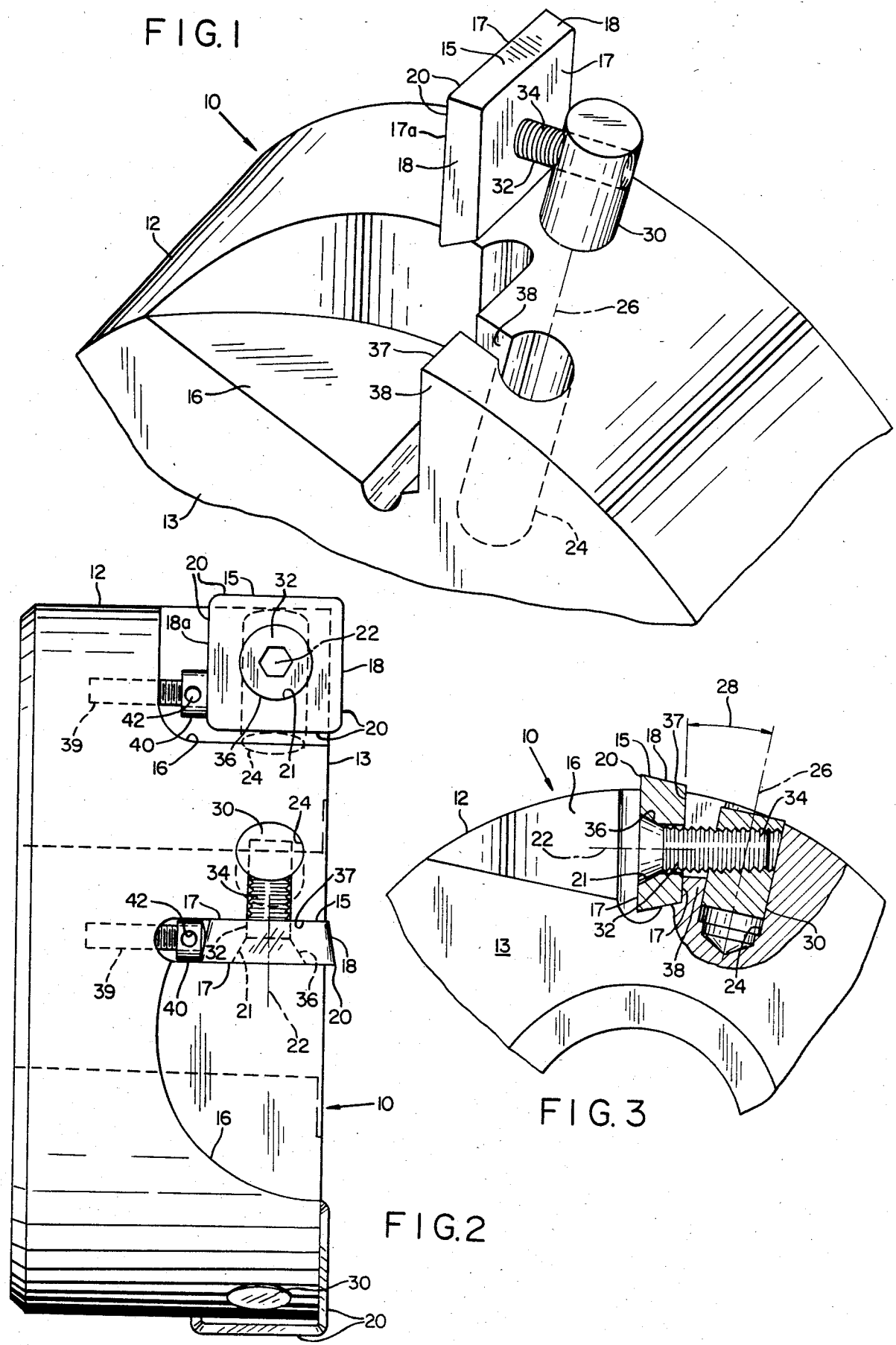

//  1

RETENTION SYSTEM FOR ROTARY CUTTER HAVING REPLACEABLE CUTTING INSERTS

BACKGROUND OF THE INVENTION

This invention relates to cutting tools in which a cutting tool holder releasably holds a replaceable cutting insert composed of an extremely hard cutting material which is discarded and replaced when dull.

Replaceable cutting inserts of the type herein concerned typically include a centrally disposed aperture wherein a screw receivable in the aperture retains the cutting insert in the tool holder.

Precise retention of the cutting insert in the tool holder during high speed rotation thereof is important as respects both positioning accuracy of the insert and safety. The problem is particularly acute when it is desired to position the insert in the holder with the cutting face of the insert substantially free of encumbrances for maximum chip flow.

It is thus a principal object of the present invention to provide a rotary cutter having replaceable cutting inserts with retention means that will insure retention of the insert notwithstanding high rotational speeds of the cutter.

It is a further object of the present invention to provide retention means for such a cutter wherein the cutting faces of the inserts are substantially free of encumbrance for maximum chip flow.

SUMMARY OF THE INVENTION

My rotary cutter comprises a rotatable holder having a work-facing surface, a recess extending inwardly of the work-facing surface and a replaceable cutting insert received in the recess. The insert is of typical form, having a side and a cutting face, the side and the cutting face cooperating to form a cutting edge. The insert has a centrally-disposed aperture whose axis is perpendicular to the cutting face.

A cylindrical bore is disposed in the holder. The bore has a generally radially disposed axis which makes an acute angle with the cutting face of the insert. A cylindrical locking member is received in the bore and is longitudinally displaceable therein. A locking screw includes a shank and an insert-engaging head. The head is received in the aperture of the insert. The shank is threadedly engaged in the locking member. Tightening the screw retains the insert in the holder. The acute angle between the axis of the locking member and the cutting face of the insert insures precise retention of the insert at high rotational speeds because the resulting centrifugal force causes increased tension in the locking screw as a result of the wedging action created by the portion of the holder between the insert and the locking member.

DESCRIPTION OF THE DRAWINGS

FIG. 1 is an exploded perspective view of the cutter embodying the instant invention;

FIG. 2 is a side elevational view of the cutter; and

FIG. 3 is a partial plan view, with portions in section, of the work-facing surface of the cutter.

DESCRIPTION OF THE PREFERRED EMBODIMENT

Referring to the drawings, a cutting tool forming one embodiment of the present invention is illustrated in the form of a rotary or milling cutter 10 having a cylindrical head 12 whose work-facing surface 13 is disposed generally perpendicularly to the longitudinal axis of the tool.

The cutter 10 herein illustrated is designed to hold conventional replaceable carbide or ceramic inserts 15. Each such insert 15 is received in a recess 16. Insert 15 typically has a pair of parallel faces 17 and sides 18 which cooperate to form cutting edges 20. Each insert 15 has a centrally-disposed aperture 21 whose axis 22 is perpendicular to faces 17. Optionally, each insert may be retained in a nest (not shown) for improved support.

The retention system for the cutting insert comprises a cylindrical bore 24 positioned in the holder such that its axis 26 is generally radially-disposed with respect to the cutter, but makes an acute angle 28, preferably 10°, with cutting face 17a of the insert 15. See FIG. 3. A transverse slot 38 extends from recess 16 to bore 24. A cylindrical locking member 30 is received in and is longitudinally displaceable with respect to bore 24. An internal wrenching insert-retaining or locking screw 32 includes a threaded shank 34 and a frustoconical insert-engaging head 36. Screw 32 is received in aperture 21 such that head 36 can engage the sides thereof. Shank 34 passes through slot 38 and threadedly engages locking member 30 to retain insert 15 in the holder.

Tightening screw 32 draws insert 15 snugly into engagement with the insert-supporting face 37 of recess 16. The acute angularity between axis 26 of bore 24 and faces 17 of insert 15 causes the tightening of screw 32 to draw the entire retention system into head 12 and insures positioning accuracy and safety even at high rotational speeds.

If axis 26 of locking member 30 were parallel to faces 17 of the insert, operation of the assembly at high speeds would present a danger of the assembly being thrown from the holder due to centrifugal force. It is believed that the acute angle 28 between axis 26 and faces 17 results in increased tension in screw 32 during operation. This is due to the centrifugal force which occurs and which causes a wedging action by the wedge-shaped portion 38 between insert-supporting face 37 of recess 16 and bore 24 (see FIG. 1), the increased tension insuring retention of the assembly within the cutter.

Loosening screw 32 permits withdrawal of insert 15 and locking member 30 such that the insert can be rotated about axis 22 as required to present fresh cutting edges 20 to the work.

Positioning accuracy of edges 20 is provided by an adjusting screw 39 whose head 40 contacts a side 18a of insert 15 selectively to position the cutting edge 20 at a desired cutting position with respect to surface 13 of holder 10. Head 40 includes transverse holes 42 which permit turning of screw 39 as required.

Although the invention has described in connection with a preferred embodiment, it will be appreciated by those skilled in the art that additions, modifications and substitutions may be made without departing from the spirit and scope of the invention as defined in the following claim.

I claim:

1. In a rotary cutter comprising a rotatable holder having a work-facing surface, a recess extending inwardly of the work-facing surface and having an insert-supporting face, and a replaceable cutting insert received in the recess and supported by the supporting face, the insert having a side and a cutting face, the side and the cutting face cooperating to form a cutting edge, the insert having a centrally-disposed aperture, the aperture having an axis perpendicular to the cutting face, the improvement comprising:

a cylindrical bore disposed in the holder, the bore having a generally radially disposed axis, the axis making an acute angle with the insert-supporting face of the recess, the bore forming a wedge-shaped portion in the holder between the bore and the insert-supporting face of the recess;

a transverse slot passing through the wedge-shaped portion of the holder;

a cylindrical locking member received in the bore and longitudinally displaceable therein; and a locking screw having a shank and an insert-engaging head, the screw being received in the aperture of the insert, the head engaging the sides of the aperture, the shank of the screw passing through the slot in the wedge-shaped portion of the holder and threadedly engaging the locking member, the wedge-shaped portion of the holder causing increased tension in the screw due to centrifugal force during rotation of the cutter, the increased tension insuring retention of the insert in the holder during rotation thereof.

2. The cutter of claim 1, in which the angle between the axis of the bore and the insert-supporting face of the recess is about ten degrees.

* * * * *